United States Patent [19]
Thau

[11] Patent Number: 6,146,003
[45] Date of Patent: Nov. 14, 2000

[54] MODULAR EXTERIOR REARVIEW MIRROR ASSEMBLY

[75] Inventor: Wolfgang Thau, Gevelsberg, Germany

[73] Assignee: Donnelly Corporation, Holland, Mich.

[21] Appl. No.: 09/420,117

[22] Filed: Oct. 18, 1999

Related U.S. Application Data

[63] Continuation of application No. 08/978,593, Nov. 25, 1997, Pat. No. 6,007,222.

[30] Foreign Application Priority Data

Nov. 29, 1996 [DE] Germany ........................ 296 20 775 U

[51] Int. Cl.$^7$ ................................................. F21N 101/02
[52] U.S. Cl. ............................................................. 362/494
[58] Field of Search ............................... 362/494; 439/34, 439/36; 248/476, 479, 900; 359/839, 872, 841

[56] References Cited

U.S. PATENT DOCUMENTS

| | | | |
|---|---|---|---|
| 4,274,078 | 6/1981 | Isobe et al. | 340/98 |
| 4,475,100 | 10/1984 | Duh | 340/98 |
| 4,646,210 | 2/1987 | Skogler et al. | 362/142 |
| 4,733,336 | 3/1988 | Skogler et al. | 362/142 |
| 4,807,096 | 2/1989 | Skogler et al. | 362/142 |
| 4,809,137 | 2/1989 | Yamada | 362/61 |
| 4,890,907 | 1/1990 | Vu et al. | 350/605 |
| 4,916,430 | 4/1990 | Vu et al. | 340/363 |
| 4,988,179 | 1/1991 | Stensland | 350/637 |
| 5,014,167 | 5/1991 | Roberts | 362/83.1 |
| 5,017,903 | 5/1991 | Krippelz, Sr. | 340/472 |
| 5,109,214 | 4/1992 | Heidman, Jr. | 340/475 |
| 5,155,625 | 10/1992 | Komatsu et al. | 359/512 |
| 5,170,288 | 12/1992 | Imaizumi et al. | 359/507 |
| 5,178,448 | 1/1993 | Adams et al. | 362/83.1 |
| 5,207,492 | 5/1993 | Roberts | 362/30 |
| 5,245,480 | 9/1993 | Polzer | 359/841 |
| 5,268,795 | 12/1993 | Usami | 359/841 |
| 5,313,335 | 5/1994 | Gray et al. | 359/839 |
| 5,353,190 | 10/1994 | Nakayama et al. | |
| 5,371,659 | 12/1994 | Pastrick et al. | 362/83.1 |

(List continued on next page.)

FOREIGN PATENT DOCUMENTS

| | | |
|---|---|---|
| 0716957A1 | 6/1996 | European Pat. Off. . |
| 2634372A1 | 2/1978 | Germany . |
| 8125452 U | 12/1981 | Germany . |
| 3206526A1 | 9/1983 | Germany . |
| 3641928A1 | 11/1987 | Germany . |
| 3790327C2 | 1/1988 | Germany . |
| 3635471A1 | 4/1988 | Germany . |
| 3635473A1 | 4/1988 | Germany . |
| 3803510 | 9/1988 | Germany . |
| 3740485A1 | 6/1989 | Germany . |
| 3923932A1 | 1/1991 | Germany . |
| 4219930A1 | 12/1992 | Germany . |
| 4130176A1 | 3/1993 | Germany . |
| 19520075A1 | 12/1995 | Germany . |
| 19520320C1 | 5/1996 | Germany . |
| 19613581A1 | 10/1996 | Germany . |
| 61-188242 | 6/1986 | Japan . |
| 62-218248 | 9/1987 | Japan . |
| 7186834 | 4/1995 | Japan . |
| 8156688 | 5/1996 | Japan . |

OTHER PUBLICATIONS

German Search Report for Utility Model Application No. 296 20 775.6.

Translation of Japanese Abstract of Patent No. 03050044, published Mar. 4, 1991.

*Primary Examiner*—Laura K. Tso
*Attorney, Agent, or Firm*—Van Dyke, Gardner, Linn & Burkhart, LLP

[57] ABSTRACT

An exterior rearview mirror assembly for vehicles includes a housing, and a mirror element supported on and adjustable by an actuator module. The assembly includes a support for supporting the actuator module within the housing and the actuator module has at least one electrical drive motor for adjusting the mirror element within the housing. The actuator module and support are both provided with electrical contacts whereby electrical connection is made when the actuator module is supported by the support.

17 Claims, 2 Drawing Sheets

U.S. PATENT DOCUMENTS

| | | | |
|---|---|---|---|
| 5,475,530 | 12/1995 | Fujie et al. | 359/512 |
| 5,497,305 | 3/1996 | Pastrick et al. | 362/83.1 |
| 5,497,306 | 3/1996 | Pastrick | 362/83.1 |
| 5,602,427 | 2/1997 | Dimitriev . | |
| 5,624,176 | 4/1997 | O'Farrell et al. | 362/83.1 |
| 5,669,698 | 9/1997 | Veldman et al. | 362/83.1 |
| 5,669,699 | 9/1997 | Pastrick et al. | 362/83.1 |
| 5,669,704 | 9/1997 | Pastrick | 362/83.1 |
| 5,669,705 | 9/1997 | Pastrick et al. | 362/83.1 |
| 5,823,654 | 10/1998 | Pastrick et al. | 362/83.1 |
| 5,863,116 | 1/1999 | Pastrick et al. | 362/494 |
| 5,871,275 | 2/1999 | O'Farrell | 362/494 |
| 5,879,074 | 3/1999 | Pastrick | 362/494 |

MODULAR EXTERIOR REARVIEW MIRROR ASSEMBLY

CROSS REFERENCE TO RELATED APPLICATION

This application is a continuation of prior pending application Ser. No. 08/978,593 filed Nov. 25, 1997, now issued as U.S. Pat. No. 6,007,222.

BACKGROUND OF THE INVENTION

This invention concerns exterior mirrors for vehicles, and especially an exterior mirror including a housing, a mirror or glass support and mirror element or glass body formed in separate modules which are connected to each other by plug type or locking connectors. In addition, the invention relates to the inclusion of energy supply wires or electrical conductors for electrically driven components which are integrated in the modules and/or in the plug type and locking connectors.

Prior known rearview mirror assemblies, and especially exterior rearview mirror assemblies have required the careful assembly of various components in a piece-meal and time consuming fashion. The present invention considerably simplifies the former style of conventional motor vehicle exterior mirrors typically used on passenger cars, vans, or motor trucks. In addition, because the exterior mirror is a vehicle part which projects from the vehicle body and thus forms the extreme lateral extension of a vehicle, the present invention also expands the functionality of the exterior mirror and takes advantage of its position on the vehicle.

SUMMARY OF THE INVENTION

The present invention discloses a housing, a mirror or glass support and a mirror element or glass body for an exterior rearview mirror for vehicles which are separately formed modules linked together by plug type and locking connectors. Consequently, the logistic expense for manufacturing the wide variety and continuously growing diversity of exterior mirrors for varying vehicles is considerably reduced.

In the event the exterior mirror has a built-in, adjustable mechanism or actuator for the mirror or glass element or body, it is preferred that the actuator be included as an additional separate module which can be plugged into or locked with the mirror support and mirror element.

Furthermore, it is preferred to imprint electrical strip conductors on the mirror or glass support and to provide suitable electric contact pins on the actuator mechanism for contact with the strip conductors through connection with the mirror support. A preferred version of the invention provides for integrated electric heating in the mirror glass body module with terminal lugs which make contact with the strip conductors when in connection with the mirror or glass support. Moreover, the housing is preferably made of two separate parts, for example, an upper and lower part which, when assembled, can be locked together enclosing the mirror or glass support. For purposes of good torsional stability, it is also preferred that the mirror or glass support and/or housing parts be in a clam-shell shape. The mirror glass support includes an electric plug type connector whose contacts are connected with the strip conductors at a position close to the mirror base.

In other forms of the invention, a light module is attached to the front exterior mirror. Such a module or light module can encompass particular functions such as turn, stop and position signals, or can be built as a multi-functional element which combines the previously mentioned signals, i.e., incorporates all of these ways of giving signals in a single light module.

In one preferred embodiment of the invention, the housing is composed of a lower and upper parts. The lower part includes as an appropriate support module adapted to the mirror or glass body and/or the mirror or glass support, to the adjustable driving mechanism or actuator for the mirror or glass support and/or mirror or glass body, to the light module, as well as to the housing upper part. The housing lower part includes a support module and, thus, is the module which establishes the connection to and support on the vehicle and the necessary electrical units. Preferably, the housing lower part, on the side closest to the vehicle, has an articulated pivot or link which also includes the appropriate electrical contacts. These can be placed on the lateral forepart of the articulated link or pivot or on its cover or bottom area. Preferably, the electrical contacts are sliding contacts.

In addition, the light module itself is placed on the far side of the housing lower part from the vehicle and is located on the exterior of the housing so that it is flexible and adaptable as a module and not an integrated component. To this end, the housing upper part has a protruding tongue overlapping the light module on the side farthest from the vehicle. From a purely optical point of view, the overall exterior mirror then appears as one single unit. The light module is also provided with necessary electrical contacts such that the light module can be fitted to the housing lower part support module by means of a dovetail joint. The electrical contacts are arranged and shaped on the light module so that they will accommodate or be included in the dovetail joint.

The articulated link or pivot of the housing lower part has a vertical bore or hole for receiving a pivot pin allowing the entire exterior mirror to be rotatable and pivotable. On the side of the housing upper part which is closest to the vehicle, a cap is placed on the articulated link or pivot, or at least partially containing that link or pivot. The cap extends over the articulated link or pivot of the housing lower part. The cap also includes an axial bore or hole, coaxially aligned with the bore hole of the articulated link or pivot so as to create optical unity when viewed from the exterior.

These and other objects, advantages, purposes and features of the invention will become more apparent from a study of the following description taken in conjunction with the drawings.

DESCRIPTION OF THE PREFERRED EMBODIMENTS

Figure 1:
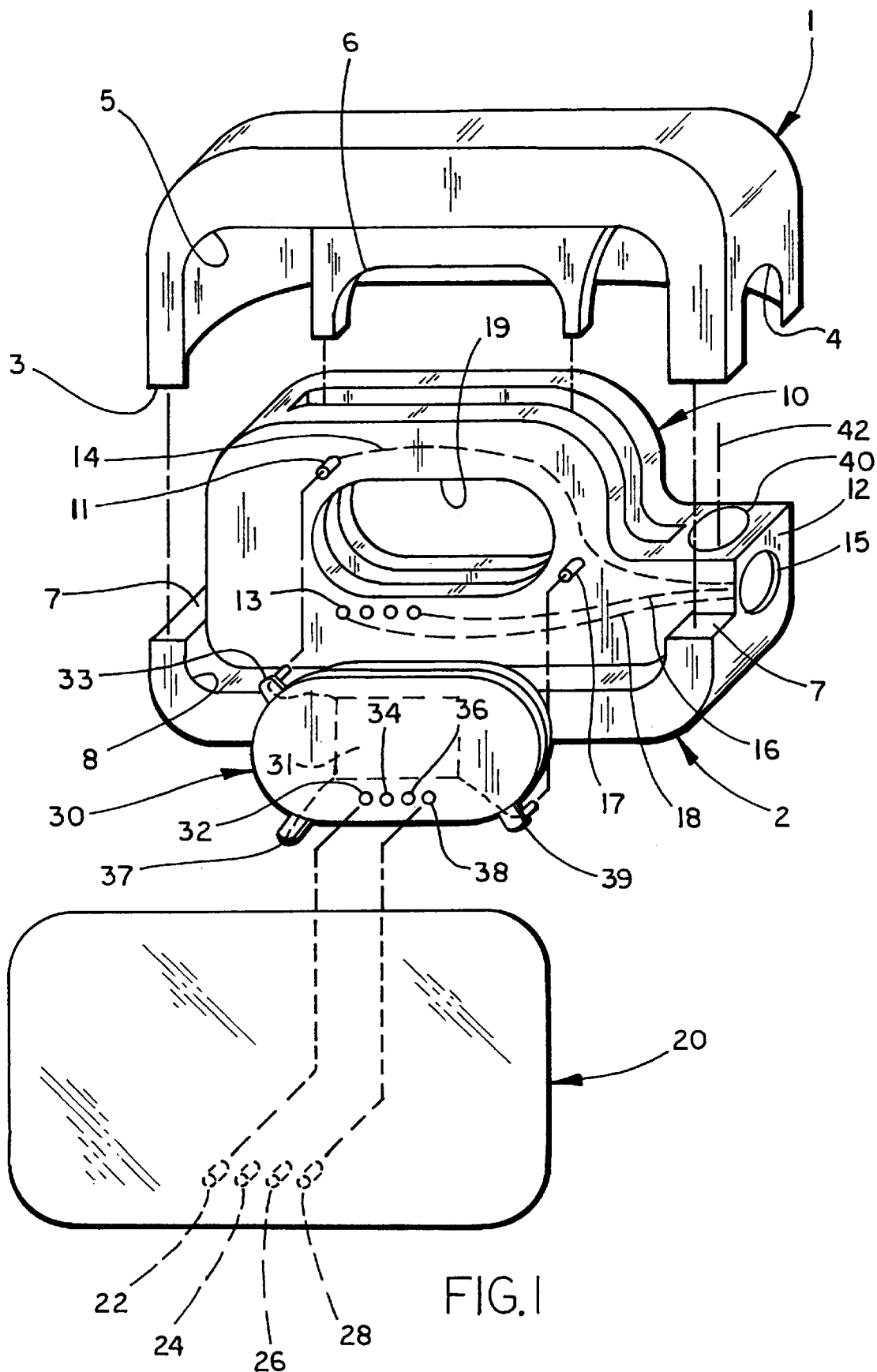
FIG. 1 is an exploded perspective view of the first embodiment of the modular exterior rearview mirror assembly of the present invention.

Referring now to the drawings in greater detail, a first embodiment of the invention is shown in FIG. 1. The housing is composed of an upper part 1 and a lower part 2 made of highly shock resistant synthetic material and designed as a clam shell. Upper part 1 has the shape of a somewhat elongated, reversed U and terminates in a curved lower surface 3 provided with connectors or stop links. On the end facing the position of the vehicle on which the mirror is intended to be mounted, upper part 1 has a roughly circular opening 4 which partially receives the mirror base end extremity of mirror or glass support 10 when assembled. On the rear side with respect to the direction of motion, housing part 1 is provided with a half opening 5 which locks the mirror or glass body 20 in the upper area after assembly. In addition, a fork 6 is shaped from the upper housing part 1, displaced inwardly in relation to the half opening 5, and receives in between an adjustable mechanism or actuator 30 for mirror or glass body 20.

Lower housing part 2 corresponds to the upper housing part 1, resembles a tub, and has an upper periphery 7 which is provided with counterlocking devices or connectors which receive those on the upper part. Thus, upper housing part 1 is locked into place with the lower housing part 2 by means of locking devices provided in areas 3 and 7. On the end closest to the vehicle, lower housing part 2 has an upward opening corresponding to opening 4 such that the base end or near extremity 12 of mirror or glass support 10 is caught between the upper housing part 1 and lower housing part 2 when these are connected. Lower housing part 2, like upper housing part 1, is made of highly shock resistant synthetic material and is also designed as a clam shell. Edge 5 of upper housing part 1 blends into edge 8 of lower housing part 2 encompassing the mirror or glass body 20 from below after assembly.

Mirror or glass support 10 is also made of strong, synthetic material and designed as a clam shell showing the shape of a kind of hollow plate. Through appropriate shapes in the interior of the upper housing part and lower housing parts, mirror or glass support 10 is contained inside the space surrounded by housing parts 1 and 2. Several electric strip conductors 14, 16, 18 are imprinted on the synthetic material of mirror or glass support 10. These are electrically connected with pins of a tip jack 15 provided in the extremity 12 of mirror support 10. Each strip connector ends in a jack 11, 13, 17 shaped in the material of the glass support, each having an electrically conductive strip inside. Furthermore, mirror support 10 has a central, somewhat elliptical opening 19 into which the appropriately shaped adjustable mechanism or actuator 30 for mirror or glass support 20 can be inserted and locked. The actuator has a somewhat elliptical housing receiving the electric regulating motors 31 for mirror or glass body 20. The electrical connections of the driving motors are linked with contact pins 33, 37, 39 protruding sideways from the body of the actuator 30 such that, when assembling the actuator, they reach the openings in jacks 11, 13, 17 where they make an electrical connection with strip conductors 14, 16, 18.

When the mirror or glass body is provided with integrated heating and/or is composed of an electrochromic mirror, electric contact pins 22, 24, 26, 28 are lined up side-by-side on the back of the mirror or glass body. These are locked in jacks 32, 34, 36, 38 on the front side of the housing of the adjustable mechanism or actuator 30. Each of these jacks 32, 34, 36, 38 contains an electric contact, which either leads to an additional connection on each contact pin 30, 37 or 39 or is looped through the housing of actuator 30 and makes contact with the same existing strip contactors when positioning the actuator housing in opening 19.

The base side extremity of glass support 10 is vertically drilled for insertion of a pivot pin through bore hole 40, whereby the folding and swiveling or pivoting axis 42 for the mirror subassembly, in relation to the mirror base, extends along the centerline of the bore hole 40.

Figure 2:
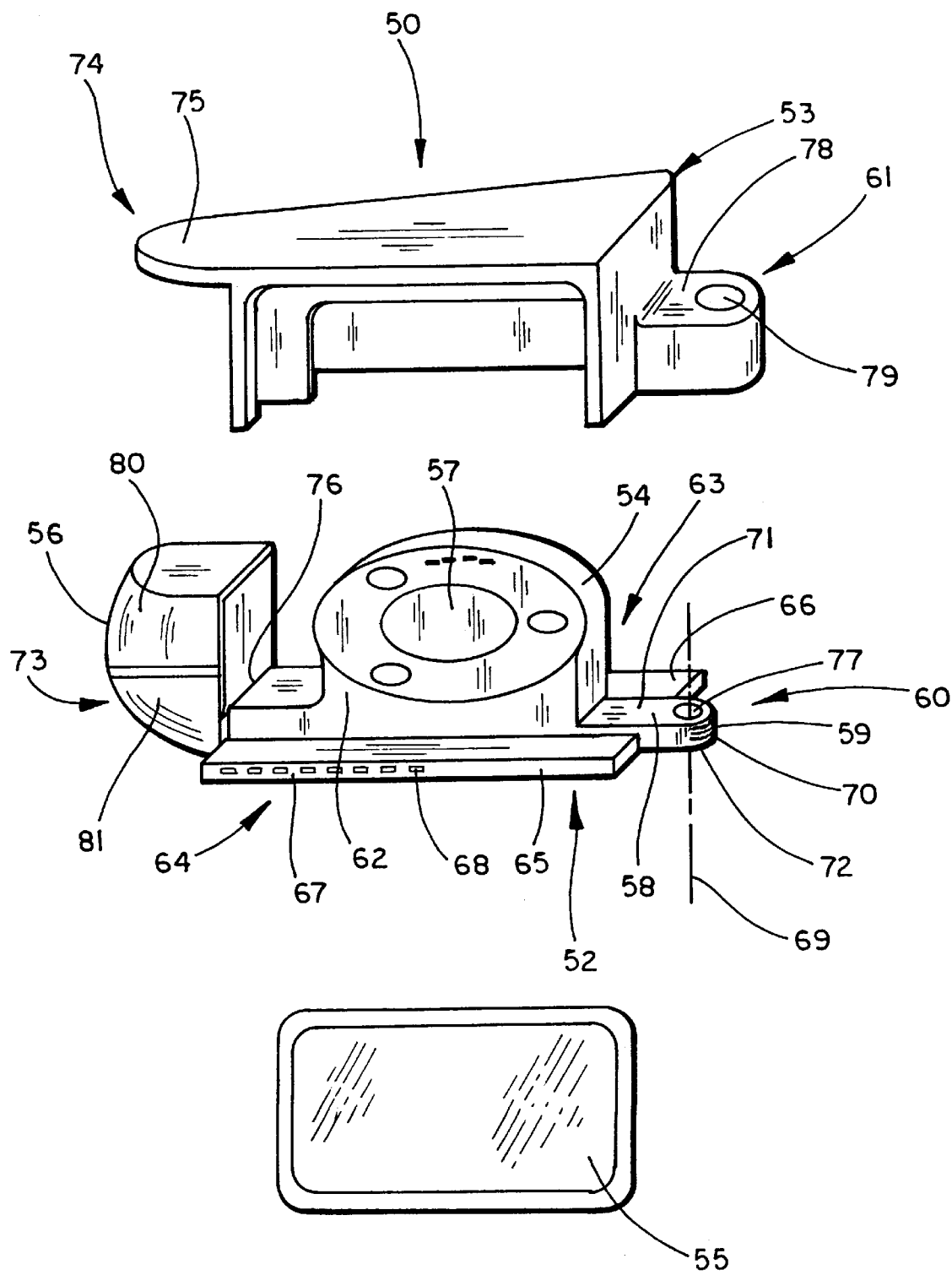
FIG. 2 is an exploded perspective view of a second embodiment of the modular exterior rearview mirror assembly of the present invention.

A second embodiment 50 of the exterior rearview mirror assembly is shown in FIG. 2. A housing lower part 52 forms the actual support module for all other adaptable modules as well as housing upper part 53. Housing lower part 52 includes a saddle part 62 on which is arranged, for example, adjustable driving mechanism or actuator 57 or mirror glass support 54 for the adjustment of the position of mirror or glass body 55. On side 63 of saddle part 62, facing the direction of oncoming traffic, and on side 64 facing the rear side which is opposite the oncoming traffic direction, shaped brackets 65 and 66 are provided on which housing upper part 53 partially rests. Brackets 65 and 66 can also be part of light module 56. Brackets 65 and 66 are not overlapped by housing upper part 53 such that bracket 65, for example, has on its forepart 67 a useful arrangement of signal giving light emitting diodes (LEDs) 68. Light module 56 is placed on end 73 of the housing lower part 52 which is farthest from the vehicle. In order to insure electrical flow, light module 56 consists of contacts 76 schematically represented in FIG. 2, which are connected with appropriate counter contacts of housing lower part 52 designed as the support module. All types of connections assuring a simple and easy assembly should be considered. On end 60 of housing lower part 52 which is designed as the support module, a protruding articulated link 58 is provided at the side of saddle part 62. Since housing lower part 52 establishes the actual connection with the vehicle, the appropriate electrical contacts 59 must also be provided here. For example, they can be located on the cover side 71, bottom area 72, or the lateral forepart 70 of articulated link 58.

For practical reasons, contacts 59 are made as sliding contacts. In order to receive a pin, articulated link 58 is provided with a bore hole 77 through which runs a pivot axis 69. Housing upper part 53 fits the lower housing part 52, at least partially, in a saucer-type configuration. On end 61 closest to the vehicle, a cap shape 78 extends over articulated link or pivot 58 of housing lower part 52. In the cap, an axial bore hole 79 is provided which fits coaxially with bore hole 77 of articulated link 58. On end 74 farthest from the vehicle, a protruding tongue 75 extending to the light module 56 juts out from the housing main part. Light module 56 can be subdivided into various signal sectors 80, 81 as represented in FIG. 2.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. An exterior rearview mirror assembly for a vehicle comprising:

a housing and a mirror element, said mirror element supported on and adjustable by an actuator module, said actuator module including a least one electrical drive motor for adjusting said mirror element within said housing;

said assembly further comprising a support for supporting said actuator module within said housing;

said actuator module provided with at least a first electrical contact, said support provided with at least a second electrical contact, said actuator module supported and engaged by said support such that electrical connection is made between said first and second electrical contacts for operation of at least said electrical drive motor upon engagement between said actuator module and said support when said actuator module is supported by said support.

2. The exterior rearview mirror assembly of claim 1 wherein said second electrical contact of said support comprises a strip connector.

3. The exterior rearview mirror assembly of claim 2 wherein said strip connector is imprinted on said support.

4. The exterior rearview mirror assembly of claim 1 wherein said first electrical contact of said actuator module comprises an electric contact pin.

5. The exterior rearview mirror assembly of claim 4 wherein said electric contact pin protrudes from said actuator module.

6. The exterior rearview mirror assembly of claim 4 wherein said second electrical contact of said support comprises a jack and wherein said jack receives said electric contact pin.

7. The exterior rearview mirror assembly of claim 1 wherein said actuator module plugs into said support in order to make said electrical connection.

8. The exterior rearview mirror assembly of claim 1 wherein said second electrical contact of said support comprises at least one jack.

9. The exterior rearview mirror assembly of claim 1 wherein said actuator module includes a housing having a shape.

10. The exterior rearview mirror assembly of claim 9 wherein said support includes an opening of said shape and wherein said actuator inserts into said shaped opening.

11. The exterior rearview mirror assembly of claim 1 wherein said support includes an opening and wherein said opening receives said actuator module.

12. The exterior rearview mirror assembly of claim 1 wherein said mirror element comprises at least one electrically operated function.

13. The exterior rearview mirror assembly of claim 12 wherein said mirror element includes at least a third electrical contact and wherein an electrical connection is made between said third electrical contact of said mirror element and an electrical contact of said actuator module when said mirror element is supported on said actuator module.

14. The exterior rearview mirror assembly of claim 13 wherein said electrical function comprises heating of said mirror element.

15. The exterior rearview mirror assembly of claim 13 wherein said electrical function comprises an electrochromic mirror.

16. The exterior rearview mirror assembly of claim 1 wherein said mirror element includes at least a third electrical contact and wherein an electrical connection is made between said third electrical contact of said mirror element and an electrical contact of said actuator module when said mirror element is supported on said actuator module.

17. The exterior rearview mirror assembly of claim 1 wherein said assembly includes a light module.

* * * * *